United States Patent
Patel et al.

(10) Patent No.: US 10,567,724 B2
(45) Date of Patent: Feb. 18, 2020

(54) DYNAMIC DEMOSAICING OF CAMERA PIXELS

(71) Applicant: GM Global Technology Operations LLC, Detroit, MI (US)

(72) Inventors: Shiv G. Patel, Brampton (CA); Mohannad Murad, Troy, MI (US); Joseph G. Machak, Oakland Township, MI (US); Fred W. Huntzicker, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/949,261

(22) Filed: Apr. 10, 2018

(65) Prior Publication Data

US 2019/0313073 A1    Oct. 10, 2019

(51) Int. Cl.
| H04N 9/78 | (2006.01) |
| G06T 3/40 | (2006.01) |
| G06K 9/62 | (2006.01) |
| G06K 9/00 | (2006.01) |
| B60R 21/015 | (2006.01) |

(52) U.S. Cl.
CPC ......... *H04N 9/78* (2013.01); *B60R 21/01538* (2014.10); *G06K 9/00825* (2013.01); *G06K 9/6288* (2013.01); *G06T 3/4015* (2013.01); *G06T 2200/32* (2013.01)

(58) Field of Classification Search
CPC ............... B60R 21/01538; B60R 11/04; G06T 2207/10; G06T 2207/10004; G06K 9/00771; G06K 9/00335; A61B 5/18; B60K 2350/2013
See application file for complete search history.

(56) References Cited

U.S. PATENT DOCUMENTS

| 5,883,968 | A | * | 3/1999 | Welch | ..................... | A47F 9/045 |
|---|---|---|---|---|---|---|
| | | | | | | 382/100 |
| 6,507,364 | B1 | * | 1/2003 | Bishay | .................. | G06T 3/4007 |
| | | | | | | 348/242 |
| 8,441,562 | B1 | * | 5/2013 | Szedo | .................. | H04N 17/002 |
| | | | | | | 348/275 |
| 2003/0052981 | A1 | * | 3/2003 | Kakarala | ............... | G06T 3/4007 |
| | | | | | | 348/272 |
| 2004/0016870 | A1 | * | 1/2004 | Pawlicki | ............... | B60W 30/18 |
| | | | | | | 250/208.1 |

(Continued)

*Primary Examiner* — Shawn S An
(74) *Attorney, Agent, or Firm* — Cantor Colburn LLP

(57) ABSTRACT

A method and system to perform dynamic demosaicing for a camera in a vehicle involve an array of image sensors of the camera to obtain light intensity values. Each image sensor of the array of image sensors represents a pixel. An array of filters of the camera overlays the array of image sensors and restricts a wavelength range for which the one image sensor of the array of image sensors obtains the light intensity value. The array of filters includes at least two different types of filters corresponding with two different wavelength ranges. A processor estimates a current state associated with the vehicle and selects a demosaicing algorithm based on the current state such that, for each pixel, the demosaicing algorithm facilitates an estimate of the light intensity value at a different wavelength range than the wavelength range for which the corresponding image sensor obtained the light intensity value.

12 Claims, 8 Drawing Sheets

(56) References Cited

U.S. PATENT DOCUMENTS

| | | | |
|---|---|---|---|
| 2006/0274171 A1* | 12/2006 | Wang | G06K 7/14 348/294 |
| 2008/0240559 A1* | 10/2008 | Malvar | G06T 3/4015 382/167 |
| 2011/0181762 A1* | 7/2011 | Otuka | G06T 3/4015 348/273 |
| 2013/0329053 A1* | 12/2013 | Jones | H04N 9/735 348/164 |
| 2015/0215590 A1* | 7/2015 | Nowozin | G06T 3/4015 348/242 |
| 2017/0053379 A1* | 2/2017 | Wang | G06T 3/4015 |
| 2017/0169265 A1 | 6/2017 | Wang | |
| 2017/0223288 A1* | 8/2017 | Diedrich | B60R 1/00 |
| 2018/0164831 A1* | 6/2018 | Han | B60R 1/00 |
| 2018/0210173 A1* | 7/2018 | Blahnik | G02B 13/0045 |
| 2018/0365991 A1* | 12/2018 | Yamanoi | H04N 5/225 |
| 2019/0019298 A1* | 1/2019 | Bae | G06T 7/246 |

\* cited by examiner

DYNAMIC DEMOSAICING OF CAMERA PIXELS

The subject disclosure relates to dynamic demosaicing of camera pixels.

Vehicles (e.g., automobiles, trucks, construction equipment, farm equipment, automated factory equipment) increasingly include sensors that obtain information about the vehicle operation and the environment around the vehicle. Some sensors, such as cameras, radio detection and ranging (radar) systems, and light detection and ranging (lidar) systems can detect and track objects in the vicinity of the vehicle. By determining the relative location and heading of objects around the vehicle, vehicle operation may be augmented or automated to improve safety and performance. For example, sensor information may be used to issue alerts to the driver of the vehicle or to operate vehicle systems (e.g., collision avoidance systems, adaptive cruise control system, autonomous driving system). A camera may include a color filter array (CFA) that is typically associated with one demosaicing algorithm. Accordingly, it is desirable to provide dynamic demosaicing of camera pixels.

SUMMARY

In one exemplary embodiment, a system to perform dynamic demosaicing for a camera in a vehicle includes an array of image sensors of the camera to obtain light intensity values. Each image sensor of the array of image sensors represents a pixel. The system also includes an array of filters of the camera to overlay the array of image sensors such that each filter of the array of filters corresponds with one image sensor of the array of image sensors and restricts a wavelength range for which the one image sensor of the array of image sensors obtains the light intensity value. The array of filters includes at least two different types of filters corresponding with two different wavelength ranges. A processor estimates a current state associated with the vehicle and selects a demosaicing algorithm based on the current state such that, for each pixel. The demosaicing algorithm facilitates an estimate of the light intensity value at a different wavelength range than the wavelength range for which the corresponding image sensor obtained the light intensity value.

In addition to one or more of the features described herein, the at least two different types of filters include a red filter, a green filter, and a blue filter corresponding, respectively, with wavelength ranges of red light, green light, and blue light, and a monochrome filter corresponding with a larger wavelength range than the wavelength ranges of the red light, the green light, and the blue light.

In addition to one or more of the features described herein, the demosaicing algorithm, based on the current state being ambient light below a threshold level, adds a weighted sum of one or more light intensity values measured by one or more image sensors of the array of image sensors with the monochrome filter to an estimate of the red light, the green light, and the blue light at every pixel.

In addition to one or more of the features described herein, wherein the demosaicing algorithm, based on the current state being an approach to a traffic light, uses the light intensity level measured by one or more image sensors of the array of image sensors with the monochrome filter as an estimate of the blue light at every pixel.

In addition to one or more of the features described herein, the demosaicing algorithm, based on the current state being a lane sensing state, uses the light intensity level measured by one or more image sensors of the array of image sensors with the monochrome filter as an estimate of the red light, the green light, and the blue light at every pixel.

In addition to one or more of the features described herein, the demosaicing algorithm, based on the current state being a forward braking event, uses the light intensity level measured by one or more image sensors of the array of image sensors with the monochrome filter as an estimate of the green light and the blue light at every pixel.

In addition to one or more of the features described herein, the processor selects the demosaicing algorithm according to a rule-based algorithm that matches the current state with the demosaicing algorithm.

In addition to one or more of the features described herein, the processor estimates the current state using a radar system, a lidar system, or an ambient light detector.

In another exemplary embodiment, a method of performing dynamic demosaicing for a camera in a vehicle includes obtaining light intensity values from an array of image sensors of the camera, each image sensor of the array of image sensors representing a pixel and each image sensor of the array of image sensors having a filter of an array of filters overlaid such that the filter of the array of filters restricts a wavelength range for which the image sensor of the array of image sensors obtains the light intensity value. The array of filters includes at least two different types of filters corresponding with two different wavelength ranges. The method also includes estimating a current state associated with the vehicle, and selecting a demosaicing algorithm based on the current state such that, for each pixel, the demosaicing algorithm facilitates an estimate of the light intensity value at a different wavelength range than the wavelength range for which the corresponding image sensor obtained the light intensity value.

In addition to one or more of the features described herein, the obtaining the light intensity values includes obtaining red light, green light, blue light, and monochromatic light based on the at least two different types of filters including a red filter, a green filter, and a blue filter corresponding, respectively, with wavelength ranges of the red light, the green light, and the blue light, and a monochrome filter corresponding with the monochromatic light with a larger wavelength range than the wavelength ranges of the red light, the green light, and the blue light.

In addition to one or more of the features described herein, based on the estimating the current state indicating an ambient light level below a threshold level, the selecting the demosaicing algorithm includes selecting the demosaicing algorithm that adds a weighted sum of one or more light intensity values measured by one or more image sensors of the array of image sensors with the monochrome filter to an estimate of the red color, the green color, and the blue color at every pixel.

In addition to one or more of the features described herein, based on the estimating the current state indicating an approach to a traffic light, the selecting the demosaicing algorithm includes selecting the demosaicing algorithm that uses the light intensity level measured by one or more image sensors of the array of image sensors with the monochrome filter as an estimate of the blue light at every pixel.

In addition to one or more of the features described herein, based on the estimating the current state indicating a lane sensing state, the selecting the demosaicing algorithm includes selecting the demosaicing algorithm that uses the light intensity level measured by one or more image sensors of the array of image sensors with the monochrome filter as an estimate of the red light, the green light, and the blue light at every pixel.

In addition to one or more of the features described herein, based on the estimating the current state indicating a forward braking event, the selecting the demosaicing algorithm includes selecting the demosaicing algorithm that uses the light intensity level measured by one or more image sensors of the array of image sensors with the monochrome filter as an estimate of the green light and the blue light at every pixel.

In addition to one or more of the features described herein, the selecting the demosaicing algorithm is according to a rule-based algorithm that matches the current state with the demosaicing algorithm.

In addition to one or more of the features described herein, the estimating the current state is based on information from a radar system, a lidar system, or an ambient light detector.

In yet another exemplary embodiment, a non-transitory computer readable medium stores instructions that, when processed by processing circuitry, cause the processing circuitry to implement a method of performing dynamic demosaicing for a camera in a vehicle. The method includes obtaining light intensity values from an array of image sensors of the camera, each image sensor of the array of image sensors representing a pixel and each image sensor of the array of image sensors having a filter of an array of filters overlaid such that the filter of the array of filters restricts a wavelength range for which the image sensor of the array of image sensors obtains the light intensity value. The array of filters includes at least two different types of filters corresponding with two different wavelength ranges. The method also includes estimating a current state associated with the vehicle, and selecting a demosaicing algorithm based on the current state such that, for each pixel, the demosaicing algorithm facilitates an estimate of the light intensity value at a different wavelength range than the wavelength range for which the corresponding image sensor obtained the light intensity value.

In addition to one or more of the features described herein, the obtaining the light intensity values includes obtaining red light, green light, blue light, and monochromatic light based on the at least two different types of filters including a red filter, a green filter, and a blue filter corresponding, respectively, with wavelength ranges of the red light, the green light, and the blue light, and a monochrome filter corresponding with the monochromatic light with a larger wavelength range than the wavelength ranges of the red light, the green light, and the blue light.

In addition to one or more of the features described herein, the selecting the demosaicing algorithm is according to a rule-based algorithm that matches the current state with the demosaicing algorithm.

In addition to one or more of the features described herein, the estimating the current state is based on information from a radar system, a lidar system, or an ambient light detector.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
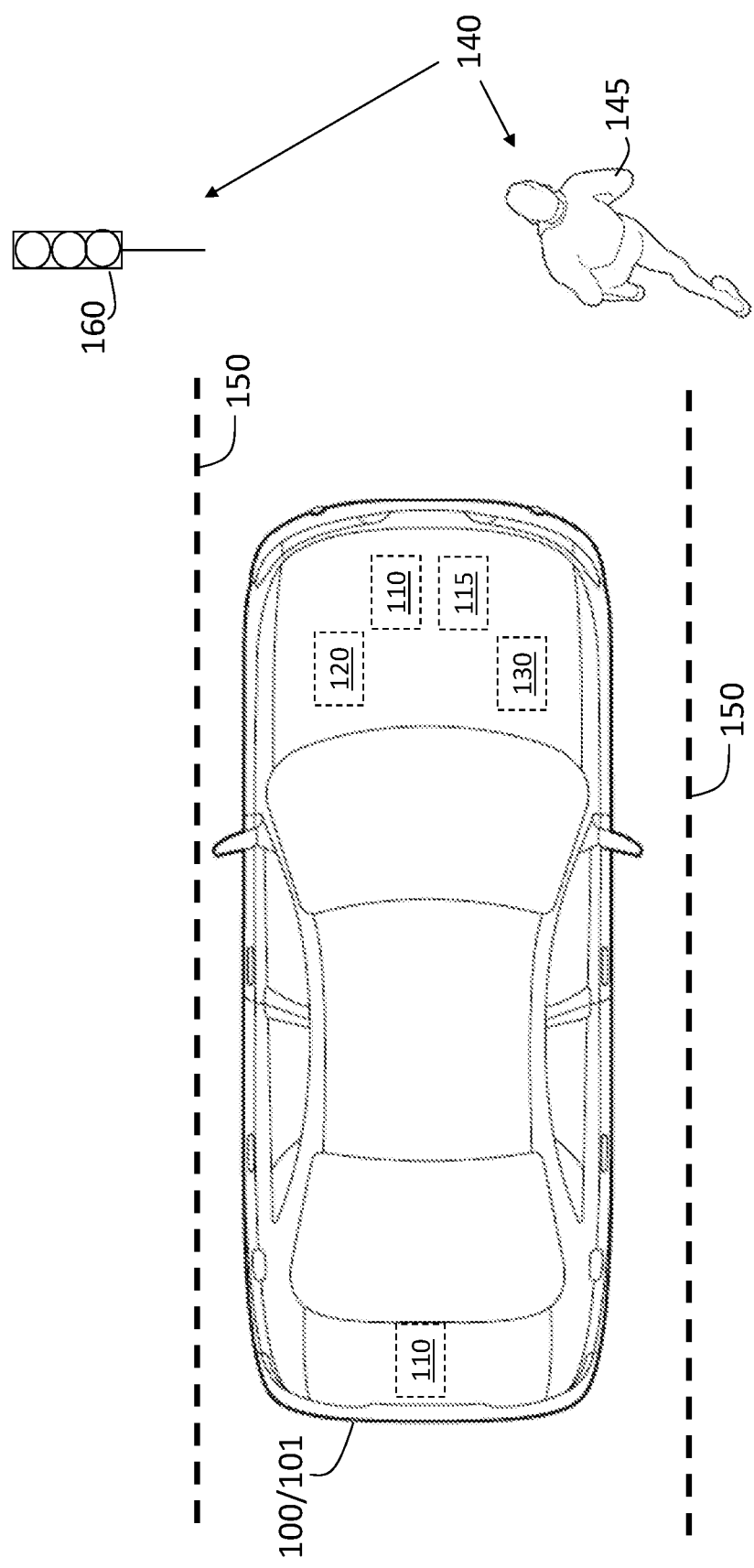
FIG. 1 is a block diagram of a vehicle with a camera that includes dynamic demosaicing of camera pixels.

The following description is merely exemplary in nature and is not intended to limit the present disclosure, its application or uses. It should be understood that throughout the drawings, corresponding reference numerals indicate like or corresponding parts and features.

As previously noted, a camera is one of the sensors that may be used to detect and track objects around a vehicle. Generally, a camera includes an imager, which includes image sensors that may be a complementary metal-oxide-semiconductor (CMOS) integrated circuits, for example. Each image sensor is associated with an image pixel and includes a photodetector that captures light (i.e., measures light intensity) and converts the measurement to an electrical signal. Because these electrical signals do not convey information about color, each image sensor typically has a filter overlaid on it that causes the image sensor to measure light intensity predominantly from one range of wavelengths or bandwidth range specified by the filter. The set of all the color filters on all the image sensors of the imager form a mosaic of color filters referred to as the CFA. For explanatory purposes, image sensors that have no color filter (i.e. monochrome pixels) are considered part of the CFA and reference is made to monochrome or monochromatic filters associated with those image sensors. For example, the CFA may include a mosaic of filters that pass red, green, or blue light. Each image sensor will only directly measure the intensity in one bandwidth range of light (corresponding with one color) but not the other two. For example, a given image sensor may measure the intensity of red light, but not green or blue light, or of green light, but not red or blue light, or of blue light, but not red or green light. To infer the intensity of the other two wavelength ranges of light, an algorithm called demosaicing is implemented. Based on the demosaicing, a complete image, in which the color of each pixel results from consideration of all the filters in some specified way, can be obtained.

A demosaicing algorithm may be straight-forward. For example, the demosaicing algorithm can specify that the red and green contributions associated with a pixel that had a blue filter applied will be the same as the red contribution for the closest pixel that had a red filter applied and the green contribution for the closest pixel that had a green filter applied. Other demosaicing algorithms may average the intensities recorded by image sensors with the same filter in a given region. For example, nearby image sensor outputs with red filters applied may be averaged and used as the red contribution for other pixels that had other (non-red) filters applied.

Embodiments of the systems and methods detailed herein relate to dynamic demosaicing of camera pixels. According to the embodiments, a CFA may include filters for more than one color. Exemplary known CFAs include the Bayer filter (red, green, blue (RGB) filter), the red, green, blue, emerald (RGBE) filter, the cyan, yellow, green, magenta (CYGM) filter, and the monochromatic filter that passes a relatively wider range of wavelengths compared with RGB filters, for example, that correspond with shades of a color (e.g., gray). For explanatory purposes, a CFA that includes RGB and monochrome filters is discussed. However, other combinations of filters are within the contemplated scope. According to the embodiments, vehicle state and other information is used to select a specific demosaicing algorithm.

In accordance with an exemplary embodiment, FIG. 1 is a block diagram of a vehicle 100 with a camera 110 that includes dynamic demosaicing of camera pixels. The vehicle 100 shown in FIG. 1 is an automobile 101 and is shown between lane markers 150. Two cameras 110 are shown; one at the front of the automobile 101 and the other at the back. According to alternate or additional embodiments, one or more cameras 110 may be located elsewhere on the vehicle 100. In further embodiments, the demosaicing algorithms and dynamic selection discussed herein may be implemented in a camera 110 that is a digital single-lens reflex (DSLR) camera, an action camera, or a cell phone camera. Another sensor 115 (e.g., lidar system, microphone, radar system) is shown, as well. Information obtained by the camera 110 and one or more other sensors 115 may be provided to a controller 120 (e.g., electronic control unit (ECU)).

The controller 120 may use the information to control one or more vehicle systems 130 (e.g., adaptive cruise control, collision avoidance, autonomous driving). Communication between the controller 120 and vehicle systems 130 may also be used to obtain information used by the vehicle systems 130 such as vehicle speed, vibration, location and heading, and upcoming maneuver (e.g., turn, lane change indicated by turn signal activation). This type of information is obtained by known vehicle sensors 115 such as gyroscopes, global positioning system (GPS) receivers and mapping systems, accelerometers and the like. In an exemplary embodiment, the vehicle 100 may be an autonomous vehicle that is controlled, at least in part, by the controller 120. The camera 110 and one or more other sensors 115 may be used to detect objects 140, such as the pedestrian 145 or traffic light 160, shown in FIG. 1. The controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
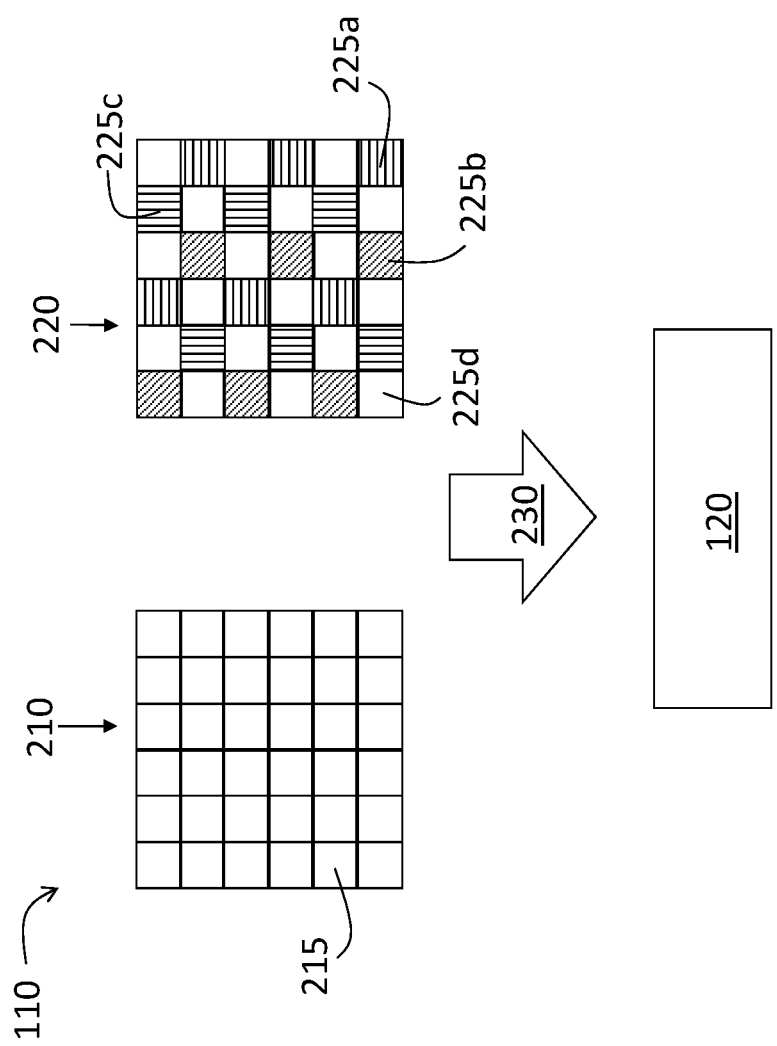
FIG. 2 details aspects of the camera relating to dynamic demosaicing according to one or more embodiments.

FIG. 2 details aspects of the camera 110 relating to dynamic demosaicing according to one or more embodiments. An image sensor array 210 of image sensors 215 and corresponding CFA 220 of filters 225 are shown. In the camera 110, the CFA 220 is overlaid on the image sensor array 210 to affect wavelengths for which light intensity is measured by each image sensor 215. The CFA 220 is shown with four different filters 225a, 225b, 225c, 225d (generally referred to as 225). The filter 225a may be specific to red light, the filter 225b may be specific to green light, the filter 225c may be specific to blue light, and the filter 225d may be a monochrome (e.g., grayscale) filter. As such, the filter 225d may admit significantly more light—on the order of 300 percent more, for example—than the other filters 225a, 225b, 225c.

The electrical signals 230 output by the image sensors 215 based on their corresponding filters 225 are provided for processing to the controller 120 according to an exemplary embodiment. In alternate embodiments, one or more processors, within the camera 110 or external to it, may be used additionally or alternately to perform the dynamic demosaicing detailed herein. As discussed with reference to FIG. 3, for example, selection of a demosaicing algorithm requires information about the state of the vehicle 100 and may additionally use information from other sensors 115. Thus, the controller 120 or any other processor that performs the dynamic demosaicing must have access to that information.

Figure 3:
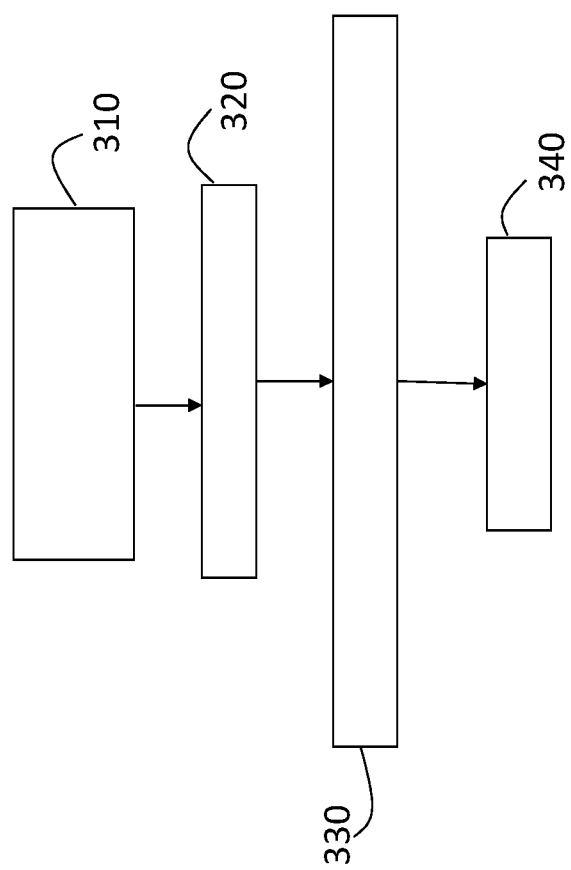
FIG. 3 is a process flow of a method of performing dynamic demosaicing according to one or more embodiments.

FIG. 3 is a process flow of a method of performing dynamic demosaicing according to one or more embodiments. At block 310, starting a new frame refers to obtaining a digital image with the camera 110. Evaluating the current state, at block 320, may be performed using different sources of information according to various embodiments. In the simplest form, the ambient light level may be measured by one of the other sensors 115 of the vehicle 100. In alternate embodiments, evaluating the current state may involve obtaining information from sensors 115 and vehicle systems 130 about the vehicle operation (e.g., speed, location, heading, upcoming maneuver), environment (e.g., ambient light condition, traffic information (e.g., urban area with heavy traffic, rural road or highway with little traffic)), or a combination of the two. The examples discussed herein are not intended to limit the information that may be considered in evaluating the current state, at block 320.

At block 330, selecting from among the demosaicing algorithms involves matching the appropriate demosaicing algorithm to the state evaluated at block 320. The matching may be performed according to a rule-based algorithm or may involve training a machine learning algorithm according to various embodiments. The examples detailed herein are not intended to limit the known approaches to matching the set of factors used to evaluate the current state, at block 320, with the available demosaicing algorithms. At block 340, processing the image refers to applying the demosaicing algorithm, selected at block 320, to the electrical signals 230 output by the image sensor array 210.

FIGS. 4-7, with continuing reference to FIG. 2, illustrate four different exemplary demosaicing algorithms 400, 500, 600, 700 that may be selected for dynamic demosaicing according to embodiments. In each illustration, the matrix indicates the intensity level measured at the corresponding image sensor 215. In the indication, R indicates that the corresponding filter 225 was red, G indicates that the corresponding filter 225 was green, B indicates that the corresponding filter 225 was blue, and C indicates that the corresponding filter 225 was monochromatic (grayscale), or there was no filter for the corresponding image sensor 115. When the CFA 220 includes more than one filter 225 of the same type, each resulting intensity level is labeled with a different number (e.g., B1 and B2 when two blue filters 225 were used). For purposes of explaining each of the demosaicing algorithms 400, 500, 600, 700, four different scenarios are considered for the filter 225 associated with the center (i.e., the center pixel X). That is, in the explanation of each demosaicing algorithm 400, 500, 600, 700, the filter 225 associated with the center pixel X being red, green, blue, or monochrome in considered. However, this is not intended to suggest that the exemplary CFA 220 itself is changing but rather to explain the treatment of each type of pixel according to the demosaicing algorithm 400, 500, 600, 700.

Applying a demosaicing algorithm (at block 340) refers to a particular way of estimating the intensity of every bandwidth of interest (e.g., R, G, B) using the measured light intensity of the bandwidth passed by every filter 225 of the CFA 220 at every pixel. As previously described, one filter 225 is used at each pixel (over each corresponding image sensor 215). Thus, one bandwidth is measured at each pixel. For example, if a filter 225 passing blue light is associated with a given image sensor 215, then the blue light intensity is measured at that pixel. The demosaicing algorithm specifies how to estimate the intensity of red light and green light at that same pixel. Similarly, if red light is measured at a given pixel, then the specific way to estimate the intensity of green light and blue light at the pixel is indicated by the demosaicing algorithm.

Figure 4:
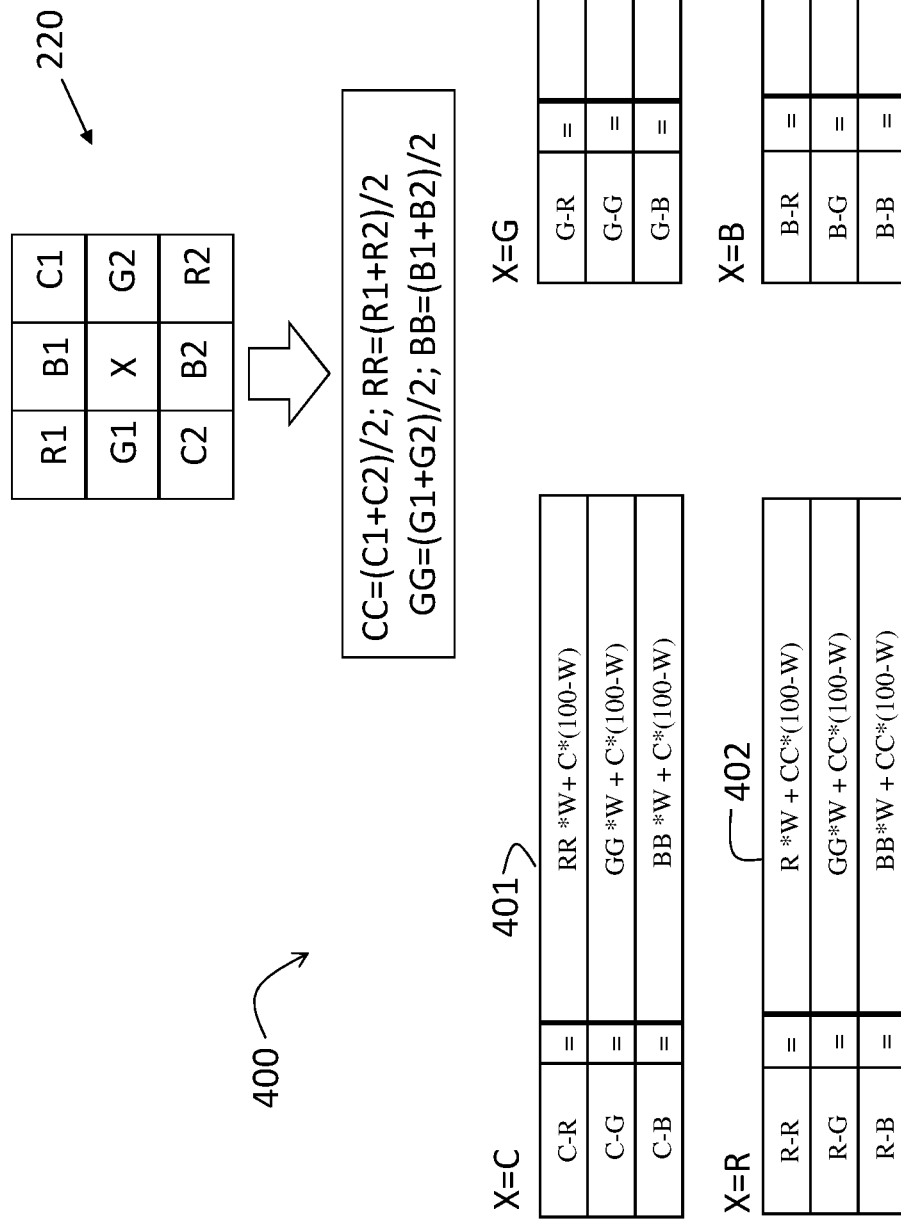
FIG. 4 illustrates an exemplary demosaicing algorithm that may be selected for dynamic demosaicing according to one or more embodiments.

FIG. 4 illustrates an exemplary demosaicing algorithm 400 that may be selected for dynamic demosaicing according to one or more embodiments. The exemplary demosaicing algorithm 400 may be selected (at block 330, FIG. 3) when the evaluation of the current state (at block 320, FIG. 3) indicates a low light condition, as discussed with reference to FIG. 8. According to the exemplary demosaicing algorithm 400, the light intensity measured by image sensors 215 with a monochromatic filter 225 (i.e., at monochromatic pixels) is included in the estimation of the red, green, and blue components for every pixel.

As FIG. 4 indicates, CC is the average of the light intensity values C1, C2 measured at the monochrome pixels, RR is the average of the light intensity values R1, R2 measured at the red pixels, GG is the average of the light intensity values G1, G2 measured at the green pixels, and BB is the average of the light intensity values B1, B2 measured at the blue pixels. The number of each type of filter 225 shown in FIG. 4 (as well as in FIGS. 5-7) is only exemplary. For example, if there were three red pixels with corresponding measured light intensity values R1, R2, R3 and only one blue pixel with corresponding light intensity value B1 surrounding the center pixel X, then RR would be an average of R1, R2, and R3, and BB would simply be B1. X indicates the pixel at the center of an exemplary CFA 220 or, more likely, a portion of a larger CFA 220. To explain the demosaicing algorithm 400, the estimates of the red, green, and blue light intensity values at the center pixel X are discussed for four different scenarios. In the first scenario, X is a monochrome (clear) pixel (X=C). In the second scenario, X is a red pixel (X=R). In the third scenario, X is a green pixel (X=G), and in the fourth scenario, X is a blue pixel (X=B).

In the case when the center pixel X is a monochrome pixel (X=C), the computation to estimate the red light intensity C-R, the green light intensity C-G, and the blue light intensity C-B at that monochrome pixel is indicated at table 401. As indicated, a weighting value W is used to balance the measured light intensity C at the monochrome pixel (X=C) with the light intensity measured at the color pixels. The value of W represents a percentage and thus may be 0 to 100. For example, the estimate of the red light intensity C-R at the monochrome pixel with a measured light intensity value of C, is given by (RR*W+C*(100−W)). As another example, the estimate of the green light intensity C-G at the monochrome pixel with the measured light intensity value C, is given by (GG*W+C*(100−W)).

When the center pixel is red (X=R), the estimate of the red, green, and blue light intensity values at the center pixel are indicated by table 402. For example, the measured red light intensity value R is adjusted to (R*W+CC*(100−W)). Further, estimates of the green and blue components at the red pixel use the averages GG and BB, respectively, as indicated by table 402 in FIG. 4. For example, the estimate of the blue light intensity R-B at the red pixel (X=R) is given by (BB*W+CC*(100−W)).

When the center pixel is green (X=G), the estimate of the red, green, and blue light intensity values at the center pixel are indicated by table 403. For example, the measured green light intensity value G is adjusted to (G*W+CC*(100−W)). Further, estimates of the red and blue components at the green pixel use averages RR and BB, respectively, as indicated by table 403 in FIG. 4. For example, the estimate of the red light intensity G-R at the green pixel (X=G) is given by (RR*W+CC*(100−W)).

When the center pixel is blue (X=B), the estimate of the red, green, and blue light intensity values at the center pixel are indicated by table 404. For example, the measured light intensity value B is adjusted to (B*W+CC*(100−W)). Further, estimates of the red and green components at the blue pixels use averages RR and GG, respectively, as indicated by table 404 in FIG. 4. For example, the estimate of the green light intensity B-G at the blue pixel (X=B) is given by (GG*W+CC*(100−W)).

When a pixel is not surrounded by other pixels, the demosaicing algorithm 400 is slightly modified. For explanatory purposes, R1 is considered to be a true corner of the CFA 220. That is, whether the CFA 220 shown in FIG. 4 is a complete CFA 220 or a portion of a CFA 220, there are only three pixels (G1, X, B1) adjacent to R1. In this case, the exemplary computations shown in table 402 may be adjusted. The value CC may still be used in the computations, because C1 and C2 are the closest monochrome pixels to pixel R1 despite their not being adjacent. If X=C, then C would be used instead of CC. The red component R1-R may be (R1*W+CC*(100−W)). The estimate of the green light intensity R1-G at pixel R1 would not consider G2 and, thus, GG. Instead, R1-G would only use the adjacent measured light intensity G1 such that R1-G is (G1*W+CC*(100−W)). However, if X=G, then an average of G1 and G would be used instead of G1 alone. Similarly, the estimate of the blue light intensity R1-B at pixel R1 would only use adjacent measured light intensity B1 such that R1-B is (B1*W+CC*(100−W)). However, if X=B, then an average of B1 and B, rather than B1 alone, would be used in the computation of R1-B. An end pixel (e.g., G1) would be treated similar to the exemplary corner pixel R1.

Figure 5:
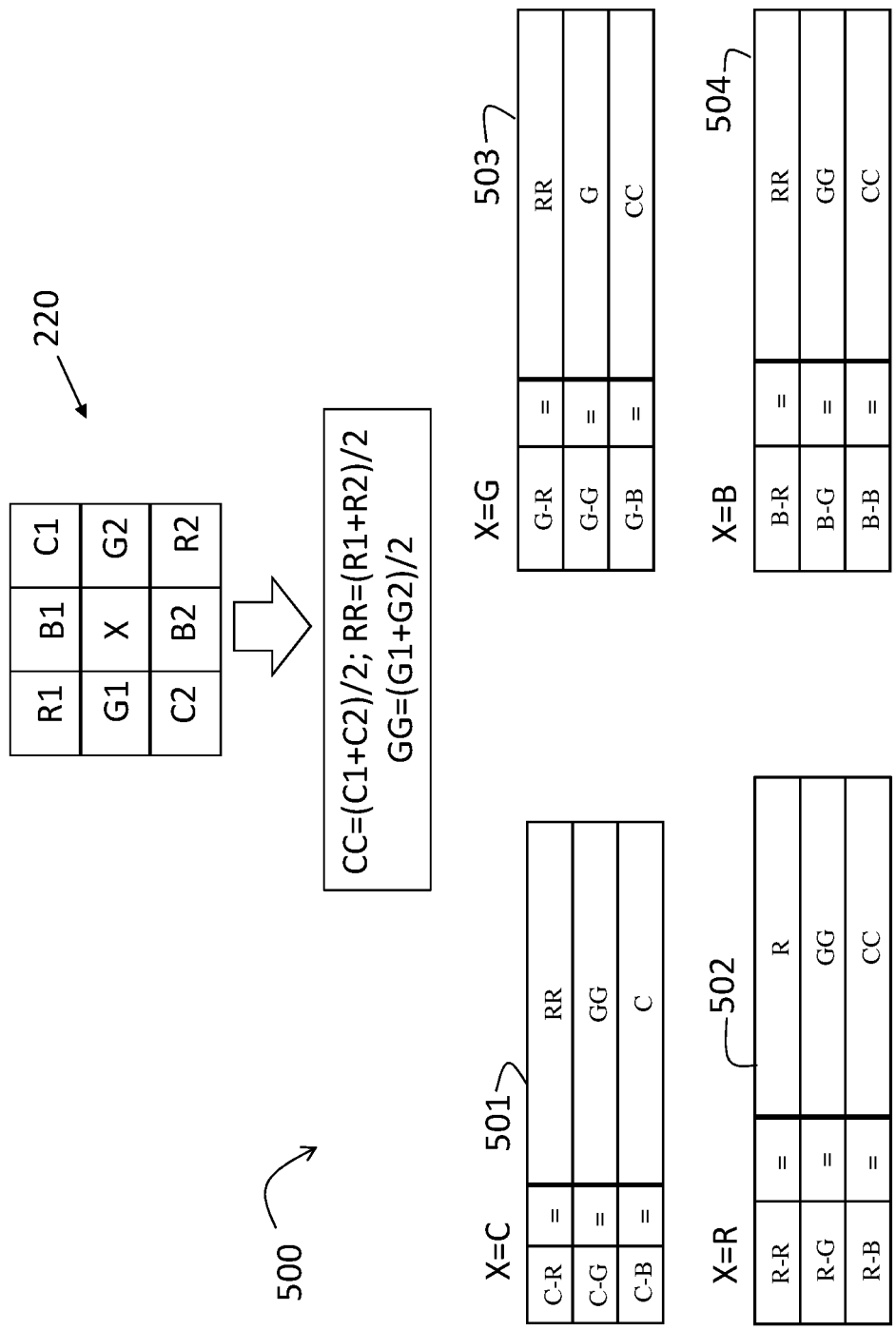
FIG. 5 illustrates another exemplary demosaicing algorithm that may be selected for dynamic demosaicing according to one or more embodiments.

FIG. 5 illustrates an exemplary demosaicing algorithm 500 that may be selected for dynamic demosaicing according to one or more embodiments. The exemplary demosaicing algorithm 500 may be selected (at block 330, FIG. 3) when the evaluation of the current state (at block 320, FIG. 3) indicates that the vehicle 100 is approaching a traffic light 160, as discussed with reference to FIG. 8. According to the exemplary demosaicing algorithm 500, the measured intensity values B1 and B2 using blue light filters 225 are not used at all. This may not be the case in an area in which the traffic lights include blue light rather than only red, yellow, and green. As FIG. 5 indicates, CC is the average of the light intensity values C1, C2 measured at the monochrome pixels, RR is the average of the light intensity values R1, R2 measured at the red pixels, and GG is the average of the light intensity values G1, G2 measured at the green pixels. As noted with reference to FIG. 4, four different scenarios are considered for the center pixel X in order to explain the demosaicing algorithm 500.

In the scenario when the center pixel is monochrome (X=C), the measured light intensity C is substituted as the estimate of the blue light intensity C-B, as indicated in table 501. The estimate of the red light intensity C-R at the center pixel is the average of measured light intensity values R1, R2 at the adjacent red pixels. That is, as indicated in table 501, C-R is RR. Similarly, the estimate of the green light intensity C-G at the center pixel is the average GG of measured light intensities at the adjacent green pixels G1, G2.

When the center pixel is red (X=R), the measured light intensity value R is retained for the red component. For the estimate of the green light intensity R-G at the center pixel, the average GG is used as indicated by table 502 in FIG. 5. For the estimate of the blue light intensity R-B at the center pixel, the average CC is used. This is because, at noted above, the blue light intensity is not of interest in the exemplary demosaicing algorithm 500. When the center pixel is green (X=G), the measured light intensity value G is retained for the green component. For the estimate of the red light intensity G-R at the center pixel, the average RR is used as indicated by table 503 in FIG. 5. For the estimate of the blue light intensity G-B, the average CC is used. When the center pixel is blue (X=B), the average CC is substituted as the blue component, as indicated by table 504 in FIG. 5. That is the measured light intensity value B is replaced with CC. For the estimate of the red light intensity B-R, the average RR is used as shown at table 504 in FIG. 5. Similarly, for the green light intensity B-G, the average GG is used as shown at table 504 in FIG. 5.

As noted with reference to FIG. 4, the demosaicing algorithm 500 may be slightly modified for corner and end pixels. For explanatory purposes, C1 is taken to be a true corner pixel of the CFA 220 such that only pixels B1, X, and G2 are adjacent pixels. For simplicity, X is assumed to be a red pixel (X=R). The estimate of the red light intensity C1-R would be R. If X were not R, then RR may still be used because R1 and R2 are equidistant from pixel C1. The estimate of the green light intensity C1-G would be G2 rather than GG, because only G2 is adjacent to C1. Finally, the estimate of the blue light intensity C1-B would be C1, because the blue light intensity is not of interest according to the demosaicing algorithm 500.

Figure 6:
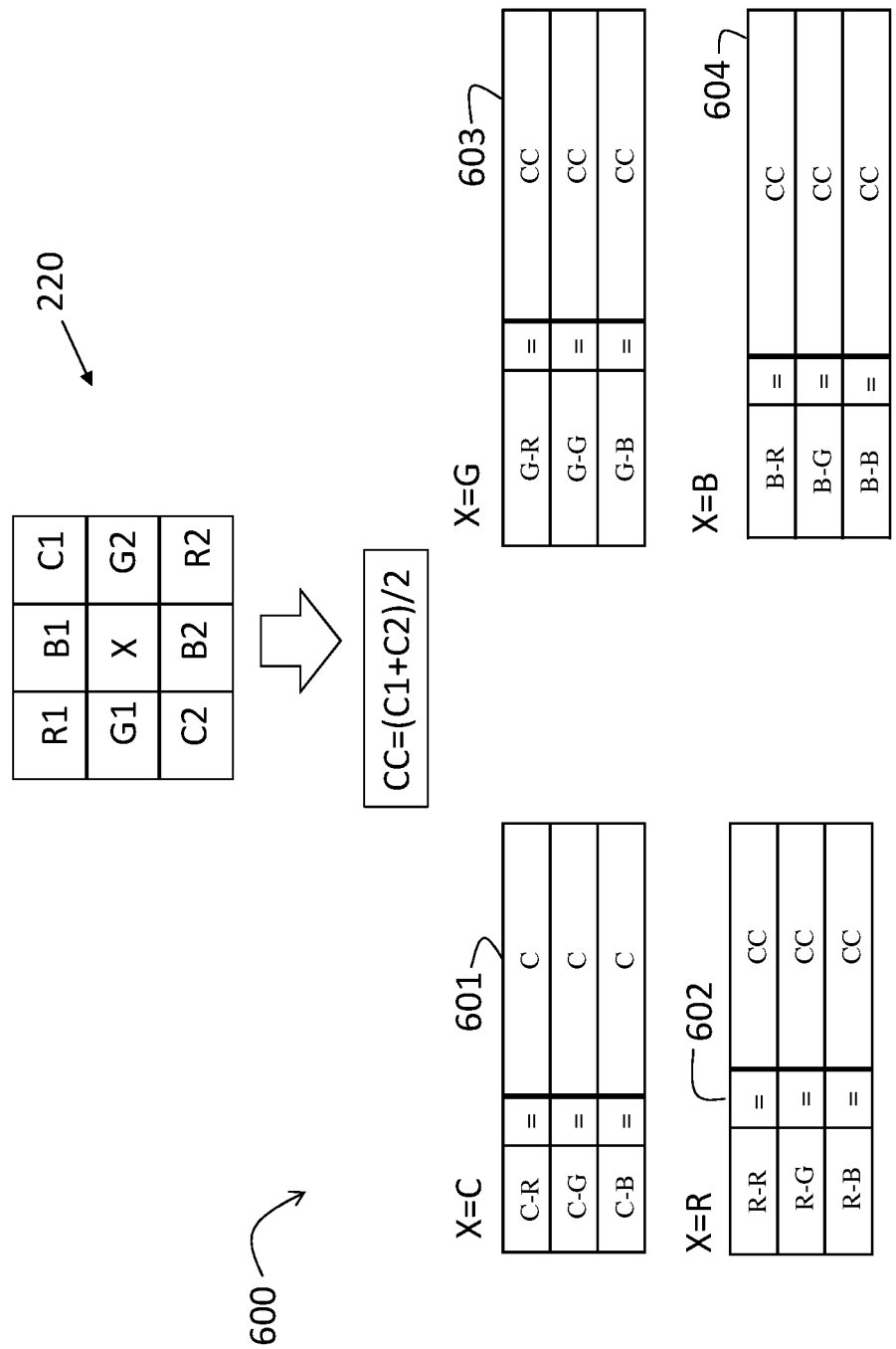
FIG. 6 illustrates yet another exemplary demosaicing algorithm that may be selected for dynamic demosaicing according to one or more embodiments.

FIG. 6 illustrates an exemplary demosaicing algorithm 600 that may be selected for dynamic demosaicing according to one or more embodiments. The exemplary demosaicing algorithm 600 may be selected (at block 330, FIG. 3) when the evaluation of the current state (at block 320, FIG. 3) indicates an upcoming lane change or another state in which lane sensing is needed, as discussed with reference to FIG. 8. According to the exemplary demosaicing algorithm 600, the light intensity measured by image sensors 215 with a monochromatic filter 225 (i.e., monochrome pixels) is used for the estimation of the red, green, and blue components for every pixel. As FIG. 6 indicates, CC is the average of the light intensity values C1, C2 measured at the monochrome pixels. Again four different scenarios are considered for the center pixel X.

For the scenario when the center pixel is a monochrome pixel (X=C), the light intensity value C measured at the center pixel is used as the estimate of the red light intensity C-R, the estimate of the green light intensity C-G, and the estimate of the blue light intensity C-B. This is indicated at table 601 in FIG. 6. When the center pixel is red, green, or blue (X=R, G, B), then the average CC is used as the estimate of the red light intensity, green light intensity, and the blue light intensity, as indicated by tables 602, 603, and 604. For example, as table 603 shows, when the center pixel is green (X=G), the estimate of the green light intensity G-G is not the measured light intensity value G but, instead, the average monochrome pixel value CC. As another example, as table 604 indicates, when the center pixel is blue (X=B), the estimate of the red light intensity B-R is also CC.

The demosaicing algorithm 600 may be modified for a corner or end pixel. For explanatory purposes, G2 is regarded as an end pixel in the CFA 220 with only pixels C1, B1, X, B2, and R2 adjacent to it. Thus, unless the center pixel is a monochrome pixel (X=C), the values of C1 alone, rather than the average CC, may be used as the estimate of the red, green, and blue light intensities. If X=C, then the average of C and C1 may be used instead.

Figure 7:
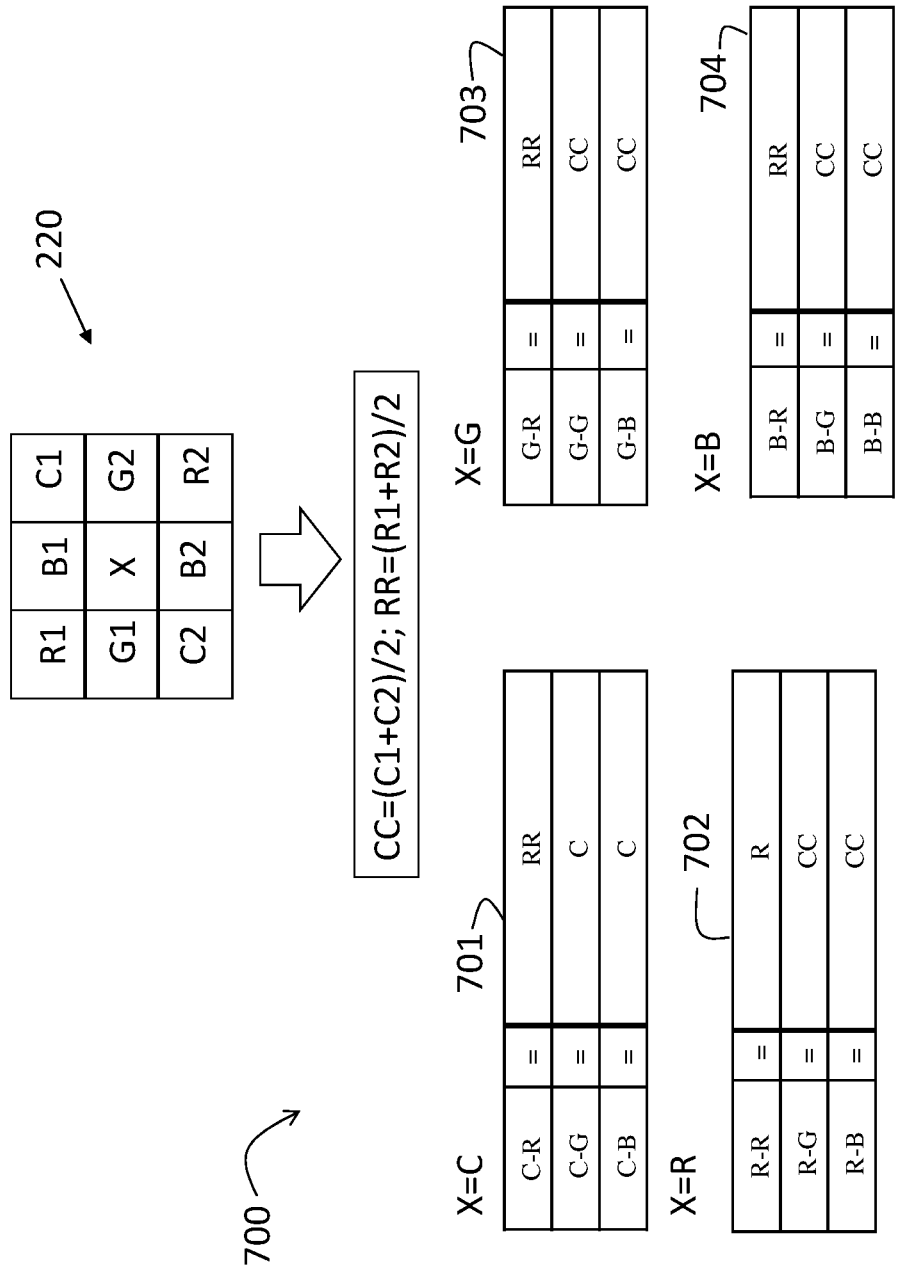
FIG. 7 illustrates yet another exemplary demosaicing algorithm that may be selected for dynamic demosaicing according to one or more embodiments.

FIG. 7 illustrates an exemplary demosaicing algorithm 700 that may be selected for dynamic demosaicing according to one or more embodiments. The exemplary demosaicing algorithm 700 may be selected (at block 330, FIG. 3) when the evaluation of the current state (at block 320, FIG. 3) indicates braking of another vehicle 100 in front of the vehicle 100 that includes the camera 110, as discussed with reference to FIG. 8. As FIG. 7 indicates, CC is the average of the light intensity values C1, C2 measured at the monochrome pixels, and RR is the average of the light intensity values R1, R2 measured at the red pixels. Because detection of red brake lights may be the focus of the detection, light intensity values G1, G2, B1, B2 measured by green or blue pixels are not used at all in the exemplary demosaicing algorithm 700. Four different scenarios involving four different values for the center pixel X are considered again.

For the scenario when the center pixel is a monochrome pixel (X=C), the estimate of the red light intensity C-R is RR, as indicated by table 701. The estimate of the green light intensity C-G, and the estimate of the blue light intensity C-B is the measured light intensity value C at the center pixel.

When the center pixel is red (X=R), the measured light intensity value R is retained as the red light intensity R-R. The value CC is used for the estimate of the green light intensity R-G, and for the estimate of the blue light itensity R-B as shown at table 702 in FIG. 7. When the center pixel is green (X=G), the value RR is used as the estimate of the red light intensity G-R, and the value CC is substituted for the measured light intensity G and is also used as the estimate of the blue light intensity G-B. When the center pixel is blue (X=B), the value RR is used as the estimate of the red light intensity B-R, and the value CC is used as the estimate of the green light intensity B-G. The value CC also replaces the measured light intensity value B as the blue light intensity, as indicated by table 704 in FIG. 7.

Again, the demosaicing algorithm 700 may be modified for corner or end pixels. For example, assuming that G1 is a true end pixel of the CFA 220 shown in FIG. 7 and also assuming that the center pixel is a monochrome pixel (X=C), then the estimate of the red light intensity G1-R would be R1 rather than RR, because R1 is adjacent to pixel G1 but R2 is not. The average of C and C2, both of which are adjacent to G1, would be substituted for the green light intensity G1-G and used as the estimate of the blue light intensity G1-B at the pixel G1.

Figure 8:
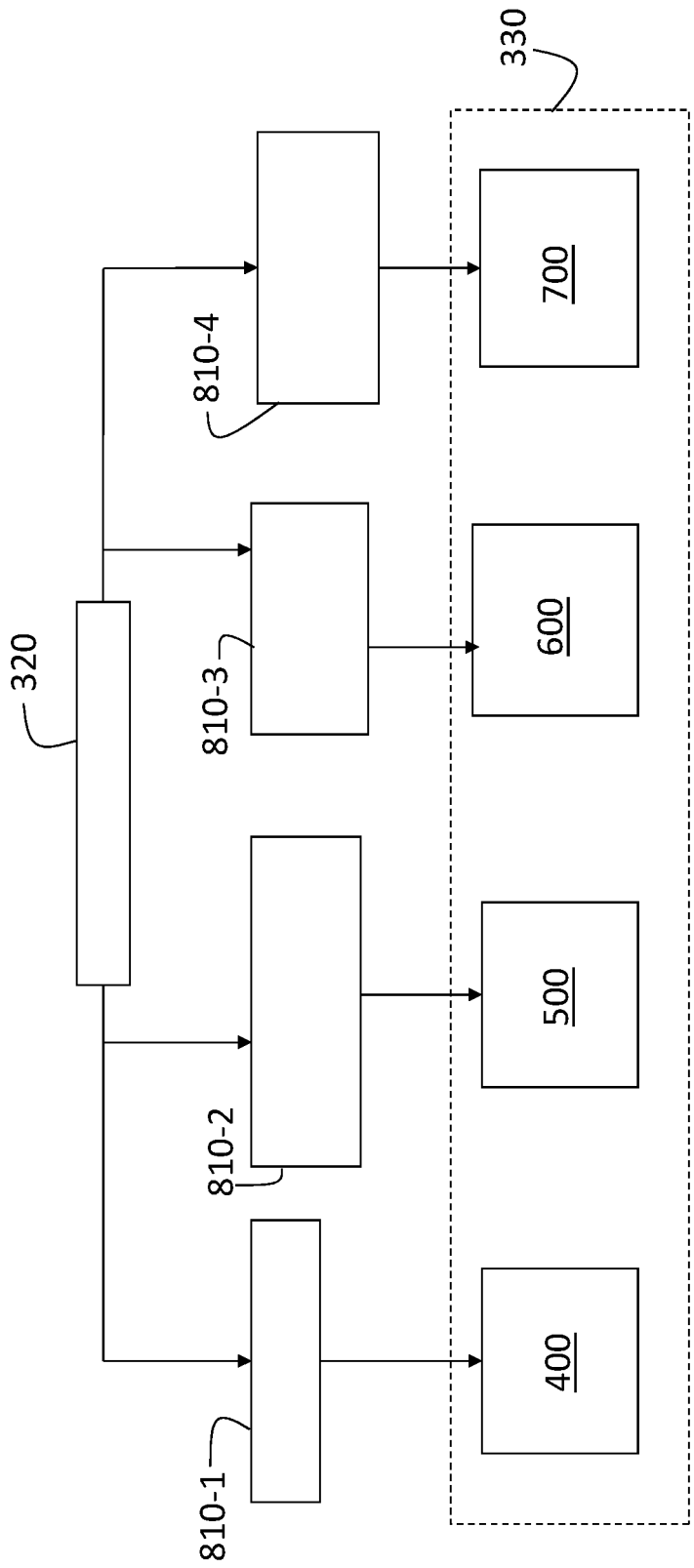
FIG. 8 is an exemplary implementation of processes discussed with reference to FIG. 3.

FIG. 8 is an exemplary implementation of processes discussed with reference to FIG. 3. At block 320, evaluating the current state results in the controller 120 identifying one of four states 810-1, 810-2, 810-3, 810-4 (generally referred to as 810). Based on the state, a one-to-one match is made in selecting the appropriate demosaicing algorithm, at block 330. Thus, the example illustrated in FIG. 8 is of a rule-based dynamic demosaicing.

State 810-1 indicates a low light condition. As previously noted, a sensor 115, such as an ambient light detector used by the automatic headlight system of the vehicle 100, may be used by the controller 120 to determine the low light state. Based on the state, the red, green, and blue components of the CFA 220 may be deemed less useful than the monochrome pixels. As such, the demosaicing algorithm 400 may be selected at block 330 to facilitate weighting and incorporating the light intensity measured by the monochrome pixels into the estimation of red, green, and blue components at each pixel.

State 810-2 indicates a condition in which a traffic light 160 is ahead of the vehicle 100, as shown in FIG. 1. The traffic light 160 may be detected based on its location in a mapping system or may be detected using the camera 110 itself with image processing. Other sensors 115 (e.g., lidar system) may be used to detect the traffic light 160, as well. As previously noted, detecting the red and green lights and, based on the combination of red and green, detecting the yellow light, is important under this state. However, the blue component of each pixel is not helpful in determining the current status of the traffic light 160. Based on the state, the demosaicing algorithm 500 may be selected at block 330. As noted in the discussion with reference to FIG. 5, the blue component is replaced with light intensity measured by the monochrome pixels according to demosaicing algorithm 500.

State 810-3 indicates a condition in which the lane markers 150, as shown in FIG. 1, need to be sensed. The condition may be determination of an upcoming lane change, as indicated by a sensor 115 or vehicle system 130 or a combination of the two. For example, activation of a turn signal may be detected in an area where the map indicates no upcoming street on which to turn. The radar system may detect another vehicle in the adjacent lane that requires ensuring that the vehicle 100 with the camera 110 stays within the adjacent lane markers 150. Based on the detection of this state, at block 320, the demosaicing algorithm 600 may be selected. As discussed with reference to FIG. 6, the monochrome pixels are the only ones used when the lane marker 150 sensing is necessary, because the color pixels do not provide additional information while the monochrome pixels allow a greater wavelength range and, thus, a higher light intensity, to be measured.

State 810-4 indicates a forward braking condition. As previously noted, this refers to braking of another vehicle 100 in front of the vehicle 100 that includes the camera 110. The state may be evaluated, at block 320, based on a sensor 115 such as a radar system that detects the other vehicle 110 in front of the vehicle 100 with the camera 110, for example. In this state, the red brake lights of the other vehicle 100 are of interest. Thus, the demosaicing algorithm 700 may be selected at block 330. As discussed with reference to FIG. 7, the demosaicing algorithm 700 maintains information obtained by red pixels but does not use light intensity measured by green or blue pixels, because those colors are not informative in this state.

While FIG. 8 illustrates one rule-based exemplary implementation of the dynamic demosaicing scheme, the example is not intended to limit the additional states and demosaicing algorithms that may be included according to a rule-based embodiment. Further, according to alternate embodiments, evaluating the current state, at block 320, may be implemented using machine learning. Selecting or generating a demosaicing algorithm, at block 330, based on the state may also be implemented using machine learning.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system to perform dynamic demosaicing for a camera in a vehicle, the system comprising:
    an array of image sensors of the camera configured to obtain light intensity values, wherein each image sensor of the array of image sensors represents a pixel;
    an array of filters of the camera configured to overlay the array of image sensors such that each filter of the array of filters corresponds with one image sensor of the array of image sensors and restricts a wavelength range for which the one image sensor of the array of image sensors obtains the light intensity value, wherein the array of filters includes at least two different types of filters corresponding with two different wavelength ranges; and
    a processor configured to estimate a current state associated with the vehicle and to select a demosaicing algorithm based on the current state associated with the vehicle such that, for each pixel, the demosaicing algorithm facilitates an estimate of the light intensity value at a different wavelength range than the wavelength range for which the corresponding image sensor obtained the light intensity value, wherein the processor is configured to select the demosaicing algorithm according to a rule-based algorithm that matches the current state associated with the vehicle with the demosaicing algorithm, the at least two different types of filters include a red filter, a green filter, and a blue filter corresponding, respectively, with wavelength ranges of red light, green light, and blue light, and a monochrome filter corresponding with a larger wavelength range than the wavelength ranges of the red light, the green light, and the blue light, and the demosaicing algorithm, based on the current state being ambient light below a threshold level, adds a weighted sum of one or more light intensity values measured by one or more image sensors of the array of image sensors with the monochrome filter to an estimate of the red light, the green light, and the blue light at every pixel.

2. The system according to claim 1, wherein the demosaicing algorithm, based on the current state being an approach to a traffic light, uses the light intensity level measured by one or more image sensors of the array of image sensors with the monochrome filter as an estimate of the blue light at every pixel.

3. The system according to claim 1, wherein the demosaicing algorithm, based on the current state being a lane sensing state, uses the light intensity level measured by one or more image sensors of the array of image sensors with the monochrome filter as an estimate of the red light, the green light, and the blue light at every pixel.

4. The system according to claim 1, wherein the demosaicing algorithm, based on the current state being a forward braking event, uses the light intensity level measured by one or more image sensors of the array of image sensors with the monochrome filter as an estimate of the green light and the blue light at every pixel.

5. The system according to claim 1, wherein the processor is configured to estimate the current state using a radar system, a lidar system, or an ambient light detector.

6. A method of performing dynamic demosaicing for a camera in a vehicle, the method comprising:
obtaining light intensity values from an array of image sensors of the camera, each image sensor of the array of image sensors representing a pixel and each image sensor of the array of image sensors having a filter of an array of filters overlaid such that the filter of the array of filters restricts a wavelength range for which the image sensor of the array of image sensors obtains the light intensity value, wherein the array of filters includes at least two different types of filters corresponding with two different wavelength ranges;
estimating, using a processor, a current state associated with the vehicle; and
selecting, using the processor, a demosaicing algorithm based on the current state associated with the vehicle such that, for each pixel, the demosaicing algorithm facilitates an estimate of the light intensity value at a different wavelength range than the wavelength range for which the corresponding image sensor obtained the light intensity value, wherein the selecting the demosaicing algorithm is according to a rule-based algorithm that matches the current state associated with the vehicle with the demosaicing algorithm, the obtaining the light intensity values includes obtaining red light, green light, blue light, and monochromatic light based on the at least two different types of filters including a red filter, a green filter, and a blue filter corresponding, respectively, with wavelength ranges of the red light, the green light, and the blue light, and a monochrome filter corresponding with the monochromatic light with a larger wavelength range than the wavelength ranges of the red light, the green light, and the blue light, and, based on the estimating the current state indicating an ambient light level below a threshold level, the selecting the demosaicing algorithm includes selecting the demosaicing algorithm that adds a weighted sum of one or more light intensity values measured by one or more image sensors of the array of image sensors with the monochrome filter to an estimate of the red color, the green color, and the blue color at every pixel.

7. The method according to claim 6, wherein based on the estimating the current state indicating an approach to a traffic light, the selecting the demosaicing algorithm includes selecting the demosaicing algorithm that uses the light intensity level measured by one or more image sensors of the array of image sensors with the monochrome filter as an estimate of the blue light at every pixel.

8. The method according to claim 6, wherein based on the estimating the current state indicating a lane sensing state, the selecting the demosaicing algorithm includes selecting the demosaicing algorithm that uses the light intensity level measured by one or more image sensors of the array of image sensors with the monochrome filter as an estimate of the red light, the green light, and the blue light at every pixel.

9. The method according to claim 6, wherein based on the estimating the current state indicating a forward braking event, the selecting the demosaicing algorithm includes selecting the demosaicing algorithm that uses the light intensity level measured by one or more image sensors of the array of image sensors with the monochrome filter as an estimate of the green light and the blue light at every pixel.

10. The method according to claim 6, wherein the estimating the current state is based on information from a radar system, a lidar system, or an ambient light detector.

11. A non-transitory computer readable medium storing instructions that, when processed by processing circuitry, cause the processing circuitry to implement a method of performing dynamic demosaicing for a camera in a vehicle, the method comprising:
obtaining light intensity values from an array of image sensors of the camera, each image sensor of the array of image sensors representing a pixel and each image sensor of the array of image sensors having a filter of an array of filters overlaid such that the filter of the array of filters restricts a wavelength range for which the image sensor of the array of image sensors obtains the light intensity value, wherein the array of filters includes at least two different types of filters corresponding with two different wavelength ranges;
estimating a current state associated with the vehicle; and
selecting a demosaicing algorithm based on the current state associated with the vehicle such that, for each pixel, the demosaicing algorithm facilitates an estimate of the light intensity value at a different wavelength range than the wavelength range for which the corresponding image sensor obtained the light intensity value, wherein the selecting the demosaicing algorithm is according to a rule-based algorithm that matches the current state associated with the vehicle with the demosaicing algorithm, the obtaining the light intensity values includes obtaining red light, green light, blue light, and monochromatic light based on the at least two different types of filters including a red filter, a green filter, and a blue filter corresponding, respectively, with wavelength ranges of the red light, the green light, and the blue light, and a monochrome filter corresponding with the monochromatic light with a larger wavelength range than the wavelength ranges of the red light, the green light, and the blue light, and, based on the estimating the current state indicating an ambient light level below a threshold level, the selecting the demosaicing algorithm includes selecting the demosaicing algorithm that adds a weighted sum of one or more light intensity values measured by one or more image sensors of the array of image sensors with the monochrome filter to an estimate of the red color, the green color, and the blue color at every pixel.

12. The non-transitory computer readable medium according to claim 11, wherein the estimating the current state is based on information from a radar system, a lidar system, or an ambient light detector.

* * * * *